US010850847B2

United States Patent
Hoogeveen et al.

(10) Patent No.: US 10,850,847 B2
(45) Date of Patent: Dec. 1, 2020

(54) SLIDE EXTRACTOR BRAKING SYSTEM

(71) Applicant: Safran Cabin Netherlands N.V., Alkmaar (NL)

(72) Inventors: Andreas Hoogeveen, Enkhuizen (NL); Paul Cornelis Vlaming, Alkmaar (NL)

(73) Assignee: Safran Cabin Netherlands N.V., Alkmaar (NL)

( * ) Notice: Subject to any disclaimer, the term of this patent is extended or adjusted under 35 U.S.C. 154(b) by 184 days.

(21) Appl. No.: 16/117,066

(22) Filed: Aug. 30, 2018

(65) Prior Publication Data
US 2019/0061950 A1 Feb. 28, 2019

Related U.S. Application Data

(60) Provisional application No. 62/552,479, filed on Aug. 31, 2017.

(51) Int. Cl.
*B64D 11/04* (2006.01)
*B64D 11/00* (2006.01)
*A47F 1/12* (2006.01)
*A47B 88/473* (2017.01)

(52) U.S. Cl.
CPC ............ *B64D 11/04* (2013.01); *A47B 88/473* (2017.01); *A47F 1/125* (2013.01); *B64D 11/003* (2013.01); *B64D 11/0007* (2013.01)

(58) Field of Classification Search
USPC ............... 16/71, 72, 78–85; 49/404, 409; 211/59.2–59.3; 294/15, 175, 209, 210; 312/307; 188/1.12, 2 D
See application file for complete search history.

(56) References Cited

U.S. PATENT DOCUMENTS

| 4,301,623 | A | * | 11/1981 | Demukai | E05F 1/16 49/404 |
| 5,634,532 | A | * | 6/1997 | Bucher | B62B 5/04 188/1.12 |
| 6,735,820 | B1 | * | 5/2004 | Teutsch | E05F 1/16 16/72 |
| 9,199,738 | B2 | * | 12/2015 | Tan | B64D 11/04 |
| 9,821,911 | B2 | * | 11/2017 | Wallbott | B64D 11/04 |

(Continued)

FOREIGN PATENT DOCUMENTS

| DE | 102009027323 | 1/2011 |
| EP | 0531246 | 3/1993 |

(Continued)

OTHER PUBLICATIONS

Europe Patent Application No. 18191716.2, Office Action dated Dec. 13, 2018.

(Continued)

*Primary Examiner* — Christopher P Schwartz
(74) *Attorney, Agent, or Firm* — Kilpatrick Townsend & Stockton LLP

(57) ABSTRACT

Embodiments of the present disclosure relate generally to improved braking systems for slide extractors. Slide extractors are generally used in aircraft galleys in order to move containers forward. The disclosed slide extractor braking system provides cooperation between magnets and corresponding conductive material in order to manage and appropriately slow retraction of the slide extractor in use.

14 Claims, 11 Drawing Sheets

(56) References Cited

U.S. PATENT DOCUMENTS

| | | | |
|---|---|---|---|
| 10,710,858 B2 * | 7/2020 | Rechberg | B64D 11/04 |
| 2012/0014627 A1 * | 1/2012 | Rehage | A47B 88/487 |
| | | | 384/49 |
| 2016/0257425 A1 * | 9/2016 | Friedrich | B64D 11/04 |

FOREIGN PATENT DOCUMENTS

| | | |
|---|---|---|
| JP | 2001078430 | 3/2001 |
| WO | 2013039981 | 3/2013 |

OTHER PUBLICATIONS

Europe Patent Application No. 18191716.2, Communication pursuant to Article 94(3) EPC (office action), dated Dec. 18, 2019.

* cited by examiner

SLIDE EXTRACTOR BRAKING SYSTEM

CROSS REFERENCE TO RELATED APPLICATIONS

This application claims the benefit of U.S. Provisional Application Ser. No. 62/552,479, filed Aug. 31, 2017, titled "Slide Extractor Braking System," the entire contents of which are hereby incorporated by reference.

FIELD OF THE DISCLOSURE

Embodiments of the present disclosure relate generally to improved braking systems for slide extractors. Slide extractors are generally used in aircraft galleys in order to move containers forward. The disclosed slide extractor braking system provides cooperation between magnets and corresponding conductive material in order to manage and appropriately slow retraction of the slide extractor in use.

BACKGROUND

Slide extractors, both for standard units and trolleys within galleys, can create problems during retraction, due to forces (of the spring, bungee cord, or other retraction element) created during retraction. FIG. 1 illustrates a slide extractor 10 in use in an aircraft galley 12. As shown, there may be instances when multiple containers 14 are positioned within a galley compartment 16 or other storage area or space. Although flight attendants or other personnel may be able to easily access the most forward container 14A, any containers, such as 14B and 14C, positioned in the compartment 16 behind the most forward container 14A are difficult to access once the forward container 14A is removed. Accordingly, the slide extractor system 10 provides a way to maneuver the more rearwardly positioned containers 14B and/or 14C forward.

Most slide extractor systems 10 provide a slide base 18 (that can be mounted to sides or base walls of the compartment 16). This is illustrated schematically by FIG. 1. Cooperable within the slide base 18 is a movable member 20, which is connected to a handle 22 via a spring, bungee cord, or other retraction element 24. One example is illustrated by FIG. 2. In this example, the retraction element 24 moves within a channel 26 of the slide base 18. When the handle 22 is pulled forward, the retraction element 24 is also pulled forward, which consequently pulls the movable member 20 forward as well. A forward face 28 of the movable member 20 will thus push the most rearwardly positioned container (in the example of FIG. 1, container 14C) forward within the compartment 16. This allows personnel to reach rear containers.

However, once the desired container has been accessed, it is often the case that the flight attendant or other personnel simply releases the handle 22, which causes rapid retraction of the retraction element 24 and movable member 20. This can create an undesirable loud bang or snapping sound. Rapid retraction can also cause damage to the components due to failure or breakage, or even injuries to personnel. Current slide extractors often do not meet desired or specified required lifetime ranges. Damages often occur at less than 2000 cycles (and most lifetime ranges are set at a minimum of 18000 cycles). Most failures of and damage to slide extractors or surrounding parts/areas result from the speed of the retracting slide. The present inventors have thus sought to create the disclosed slide extractor braking system improvements.

BRIEF SUMMARY

Embodiments of this disclosure thus provide systems and methods for managing the retraction force of slide extractors, without current consequences. The working principle uses eddy currents created between magnets and a conductive material in order to convert kinetic into magnetic energy and heat. The eddy current create a braking action of the slide extractor once it has been released and as it is retracting. Because the speed of the retraction is slowed, corresponding noises, damage, or potential injuries can be reduced.

In one example, one or more magnets are integrated within a slide extractor system. The magnets create eddy currents through the slide housing, ensuring a controlled and low speed movement when forced by a spring or bungee cord.

In one specific example, there is provided a system for slowing movement of a slide extractor used in an aircraft galley for moving one or more containers and/or trolleys forward within a storage area, the system comprising: a slide base comprising a channel; a movable member positioned within the channel and slidable with respect to the slide base; a retraction element associated with the movable member; and one or more magnets associated with either the slide base or the movable member; and wherein the other of the slide base or the movable member comprises at least a portion of a conductive surface, wherein proximity of the one or more magnets to the portion of a conductive surface causes slowing of the movable member with respect to the slide base.

In any of the preceding or any subsequent examples, the one or more magnets may be positioned within an internal channel of the slide base.

In any of the preceding or any subsequent examples, at least a first portion of the one or more magnets may be positioned in a first rail portion of the slide base and at least a second portion of the one or more magnets may be positioned in a second rail portion.

In any of the preceding or any subsequent examples, at least a portion of the slide base may be manufactured of a polymeric material.

In any of the preceding or any subsequent examples, there may also be provided one or more wear strips positioned at slide base rail edges where the moveable member slides with respect thereto.

In any of the preceding or any subsequent examples, at least a portion of a conductive surface may be positioned on a sliding portion of the movable member.

In any of the preceding or any subsequent examples, the movable member may further comprise a polymeric flange.

In any of the preceding or any subsequent examples, the movable member may further comprise a polymeric end cap.

In any of the preceding or any subsequent examples, there may further be provided a handle secured to at least one end of the retraction element.

In any of the preceding or any subsequent examples, the handle may comprise two symmetrical parts configured to cooperate with one another.

In any of the preceding or any subsequent examples, the retraction element may be secured within the handle via an abutment member.

In any of the preceding or any subsequent examples, the moveable member may comprise a pinion wheel and wherein the slide base comprises a toothed rack.

In any of the preceding or any subsequent examples, there may be provided a pulley system configured to coordinate movement of the moveable member within the slide base.

In any of the preceding or any subsequent examples, the pulley system may comprise a wheel secured to the movable member and a pulley plate to which a portion of the pulley is secured.

DETAILED DESCRIPTION

Embodiments of the present disclosure thus provide an improved slide extractor braking system. Most failures of slide extractors result from the speed of the retracting slide. The disclosed slide extractor braking system improvements allow controlled retraction without mechanical interference. They also provide noise reduction, can prevent misuse/rough use of the system, and can ensure that the handle returns more reliably to its parking position.

In one embodiment, the slide braking is conducted via creation of a series of eddy currents. As background, eddy currents are loops of electrical current induced within conductors by changing magnetic fields within the conductor. The currents are created due to a magnetic field interacting with an electrical current to produce an electromotive force (EMF), a phenomenon called electromagnetic induction.

Figure 1:
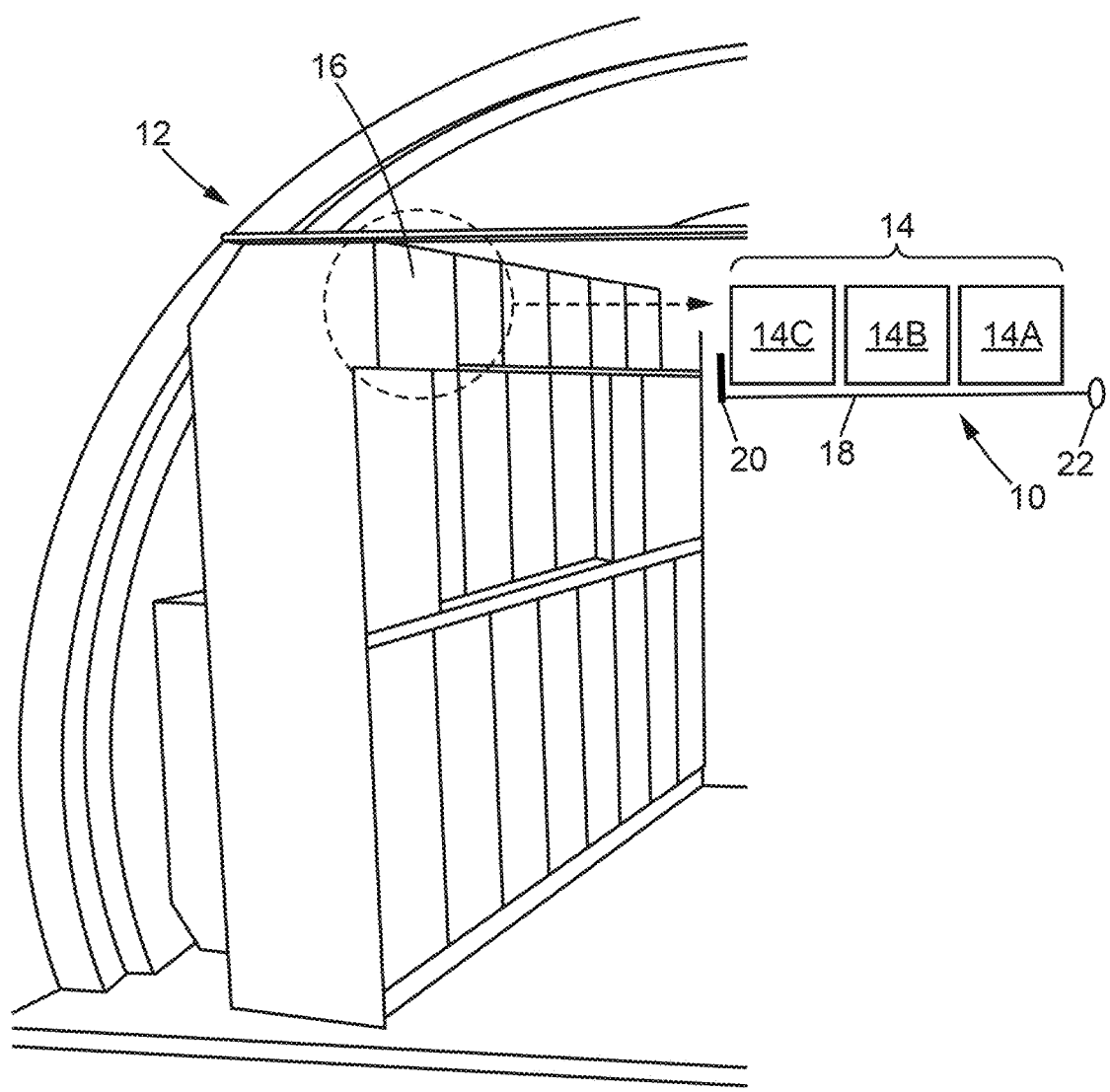
FIG. 1 is a schematic view of an aircraft galley with a slide extractor in use in order to move containers forward within a compartment.
Figure 2:
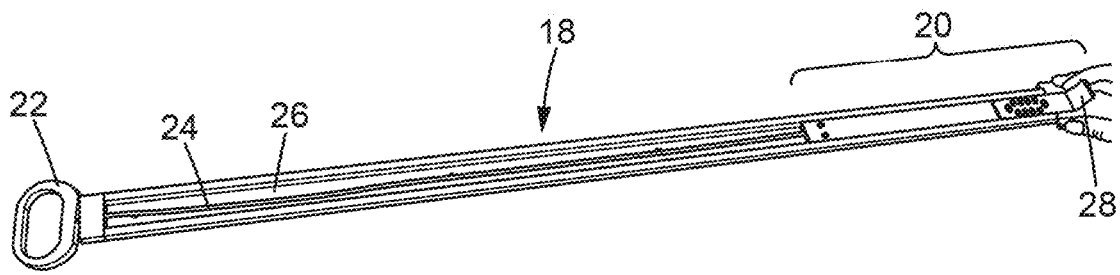
FIG. 2 shows a top perspective view of a slide extractor system.
Figure 3:
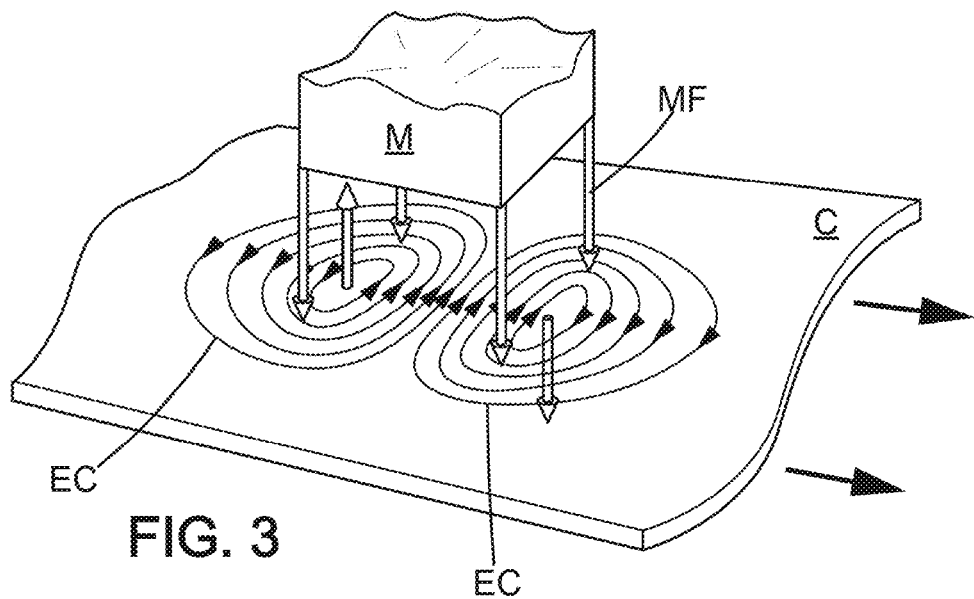
FIG. 3 is a schematic view illustrating eddy currents created via a magnet.

As illustrated by the schematic at FIG. 3, eddy currents (EC) flow in closed loops within the conductor (C), in planes perpendicular to the magnetic field (MF). The currents can be induced within the conductor (C) by a magnetic field created by motion between the magnet (M) and the conductor (C). The magnitude of the current in a given loop is proportional to the strength of the magnetic field, the area of the loop, and the rate of change of flux, and inversely proportional to the resistivity of the material.

The eddy current creates a magnetic field that opposes the change in the magnetic field that created it, and thus, eddy currents react back on the source of the magnetic field. For example, in FIG. 3, the moving surface (in this instance, the conductive (C) surface) will exert a drag force on the stationary magnet (M) that opposes its motion, due to eddy currents induced in the conductive surface (C) by the magnetic field. This effect is employed in eddy current brakes, which are used to stop rotating power tools quickly when they are turned off.

Figure 4:
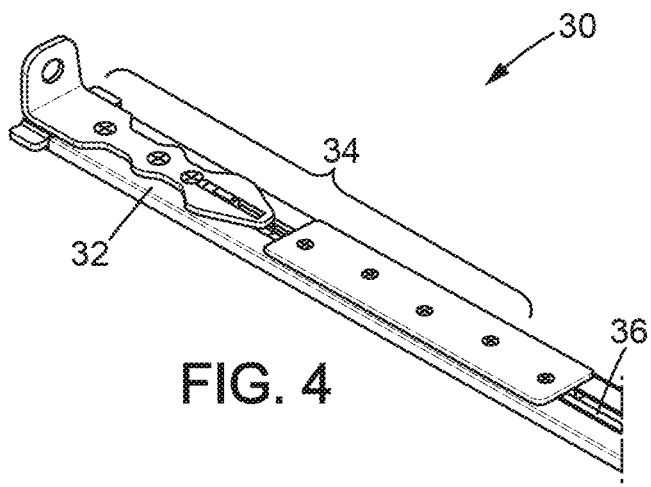
FIG. 4 shows a top perspective view of a portion of a slide extractor system.
Figure 5:
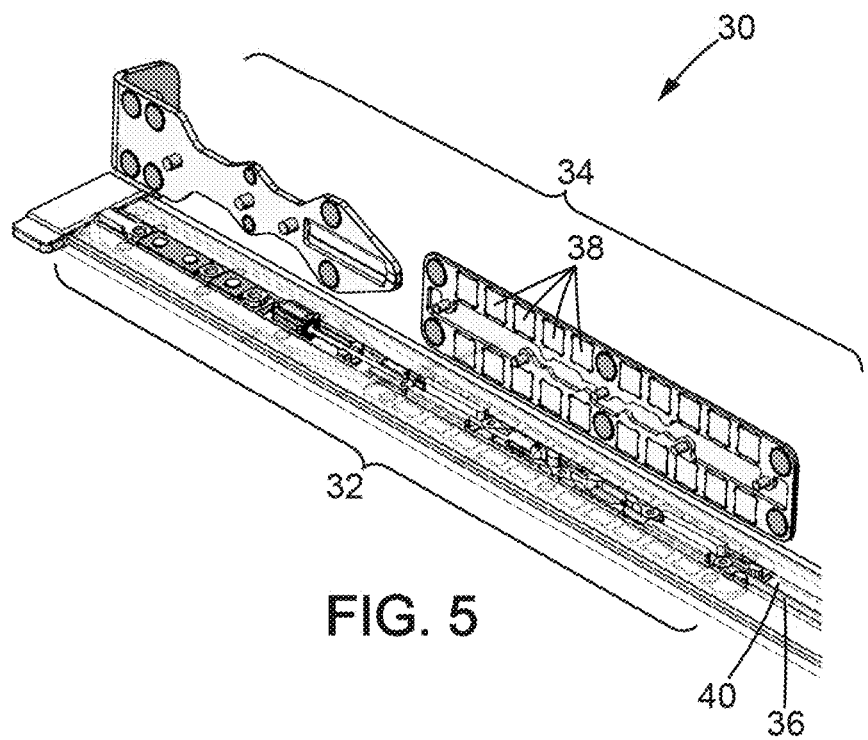
FIG. 5 shows an exploded view of the slide extractor system of FIG. 4.
Figure 6:
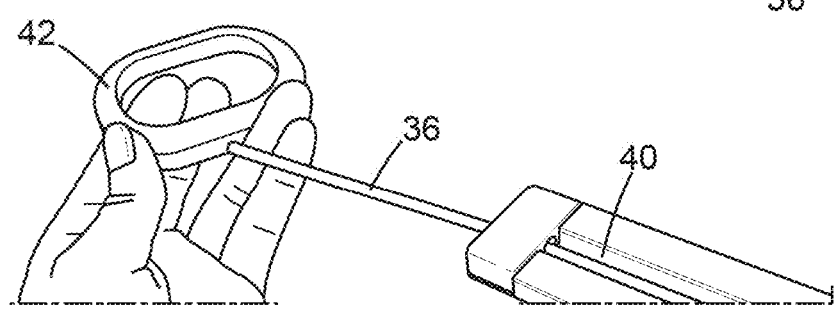
FIG. 6 shows a partial view of a slide extractor system with the handle in an extended configuration.
Figure 7:
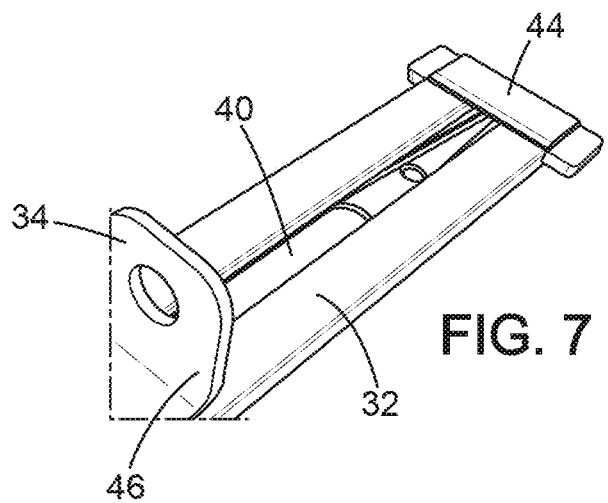
FIG. 7 shows a partial view of a rear section of a slide extractor system with the movable member moved forward due to extension of the handle shown in FIG. 6.

Referring now to FIGS. 4 and 5, in one example, there is shown a slide extractor system 30. The system 30 includes a slide base 32 and a moveable member 34. A retraction element 36 is also associated with the moveable member 34. In one embodiment, the slide base 32 material functions as the conductor (C in the above images). In order to address aircraft weight concerns, the slide base 32 may be manufactured of aluminum, such as extruded or milled aluminum. However, it should be understood that other conductive materials are possible for use and considered within the scope of this disclosure (and as described further below). In order to create the eddy currents for braking as described herein, the movable member 34 is designed as having one or more magnets 38 incorporated thereon or otherwise associated therewith. In the example shown, a plurality of small magnets 38 are positioned along a surface of the movable member 34. The magnets 38 may be positioned internal or external to the movable member 34. The movable member 34 is caused to slide within the channel 40 via pulling of the handle 42, as illustrated by FIG. 6. Force on the handle 42 (in the direction that is away from the slide base 32, in the direction of arrow) causes the moveable member 34 to slide within the channel 40, moving away from the back end 44 of the slide base 32. As long as the force is strong enough to overcome the initial magnetic force created between the slide base 32 and the moveable member 34, the member moves as shown in FIG. 7. The rear flange 46 of moveable member 34 then abuts the most rearward container on the shelf (or in the compartment 16) and causes its consequent movement forward, in the direction of the force applied to handle 42.

Once the container is removed, force is generally released from the handle. This causes the retraction element 36 (which, in the embodiment shown, is a bungee cord) to retract such that the movable member 34 slides rearwardly toward the back end 44 of the slide base 32. Without the presence of magnets 38, contact between the movable member at the area of the rear flange 46 and the back end 44 of the slide base 32 creates a loud bang or noise, such as the sound of moving metal crashing against stationary metal. However, the presence of magnets 38 creates an eddy current between the one or more magnets 38 and any conductive or metallic portion of slide base 32, creating a drag force and slowing the movement to a smooth, slowed stop. Because there is no contact with a brake shoe, there is no mechanical wear. Instead, electrical resistance causes a dragging effect analogous to friction, which dissipates the kinetic energy of the movable member 34. The resulting eddy current creates a braking force on the movable member 34 before it slams against the back end 44. This can help reduce damage, noise, and/or injuries.

In this example, the magnet 38 induces circular electric currents in the movable member 34 moving past it. Referring back to FIG. 3, the conductive metal sheet (C) is comparable to the conductive portion of the movable member moving past a stationary magnet of the slide base. Because one of the components is moving with respect to the other, the magnetic flux through the conductive/metal sheet (C) is changing. This creates a circular electric fields in the sheet in counterclockwise and clockwise directions around the magnetic field (MF) lines. This field induces the flow of electric current in the sheet the eddy current.

Although the magnets 38 are shown and described in this embodiment as being positioned on the moveable member 34, it should be understood that they may instead be positioned along a portion of the slide base 32. In this instance, the movable member 34 may have one or more portions that are manufactured of and provide the conductive material in order to create the eddy currents described.

Figure 8:
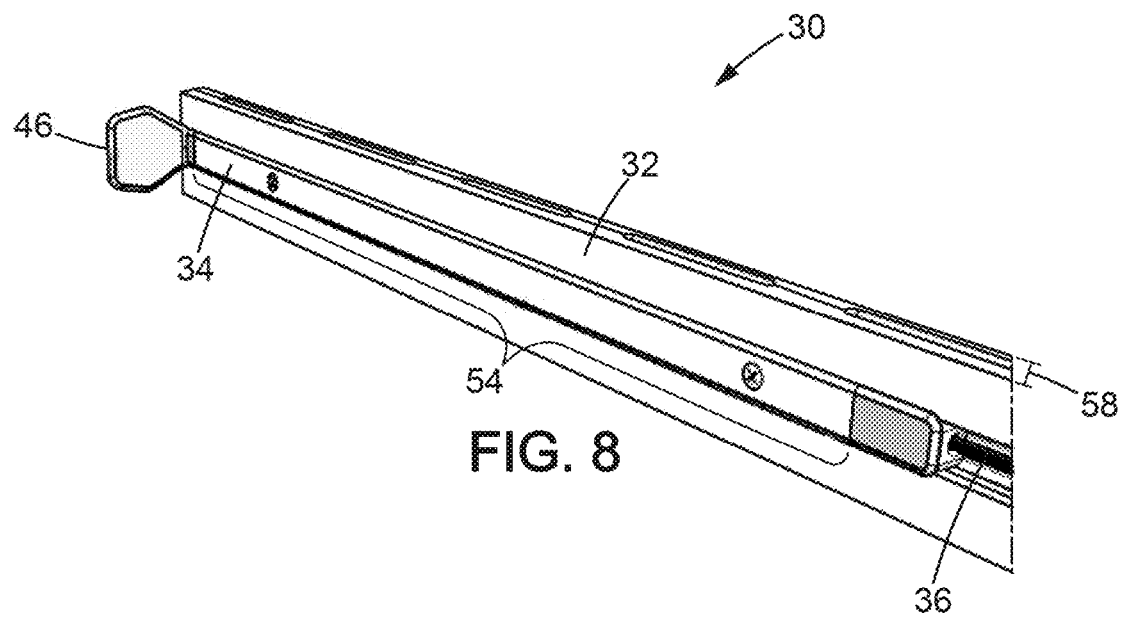
FIG. 8 shows a side perspective view of an alternate slide extractor system.
Figure 9:
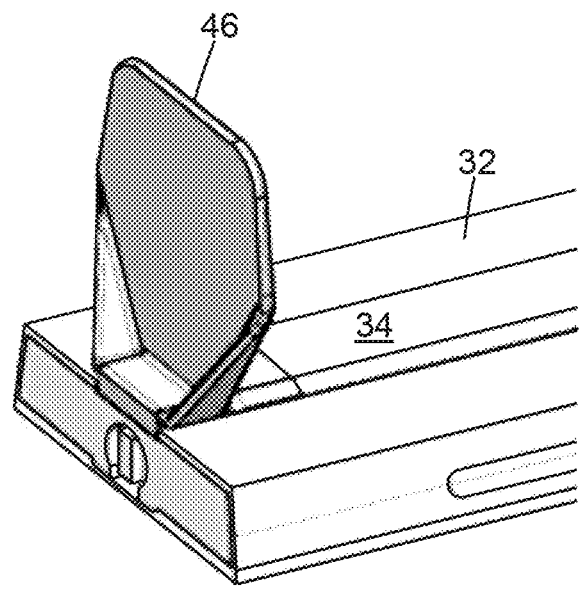
FIG. 9 shows a rear partial view of an end of the slide extractor system of FIG. 8.
Figure 10:
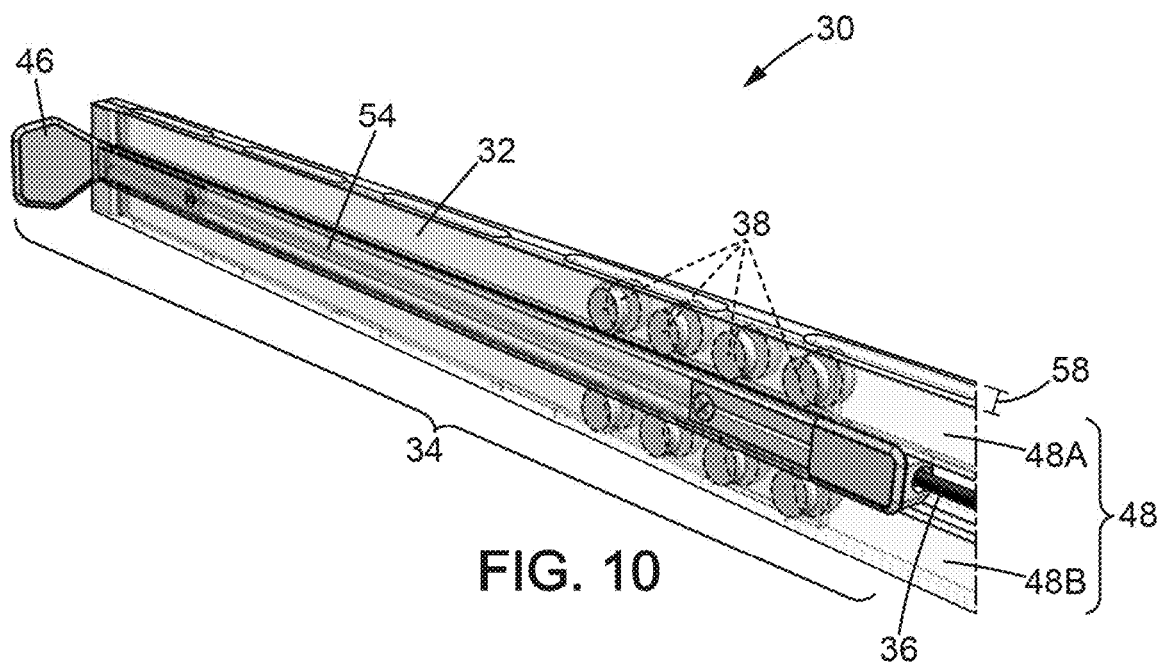
FIG. 10 shows a cut away view of the slide extractor system of FIG. 8.

In an alternate embodiment illustrated by FIGS. 8-10, it is possible to manufacture at least certain portions of the moveable member 34 from a polymer in order to reduce cost and weight. In the example shown, the rear flange 46 (which provides the pushing force against the containers to move them forward in use) may be manufactured of a polymeric material. In a specific example, the flange (which may also referred to as a "hook") may be an injection molded, glass-filled polymer. (Earlier versions had the flange manufactured of sheet metal or stainless steel).

The slide base 32 may also be manufactured out of a polymeric material. In a specific example, the slide base 32 is a milled extruded polymer rail. As shown by FIG. 10, one or more magnets 38 are mounted or otherwise positioned within the rails 48 of the slide base 32. The rails 48 may define internal channels 58 into which the magnets 38 may be positioned. In the example shown, there are four sets of small, strong magnets positioned along a first rail portion 48A, and four sets of small, strong magnets positioned along a second rail portion 48B. Each set includes two magnets, so in this version, there is a total of sixteen magnets used for the braking function. The pull strength delivered for the option shown is about 30-40 kilograms. It should be understood, however, that any number, type, or strength of magnet may be used in order to vary the pull strength and eddy current strength. If stronger magnets are used, fewer magnets may be required. Additionally, stronger magnets may help create a stronger eddy current to provide a stronger deceleration/braking function. It is also possible to provide magnets only along one of the internal channels.

Figure 11A:
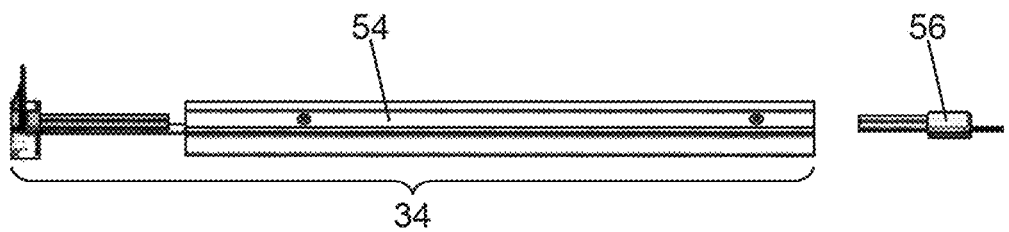
FIG. 11A shows a top plan exploded view of a sliding portion.
Figure 11B:
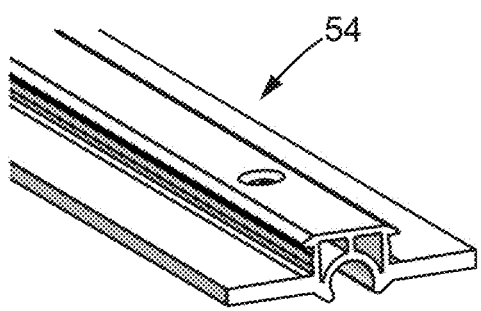
FIG. 11B shows a front perspective view of the sliding portion of FIG. 11A.
Figure 11C:
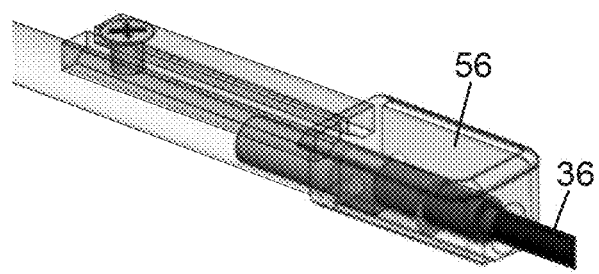
FIG. 11C shows a top partially phantom view of the end cap and sliding portion of FIG. 11A.

Referring now to FIGS. 11A-11C, only the sliding portion 54 of the movable member 34 may be made of a conductive material in order for it to create the desired eddy current. For example, the sliding portion 54 may be an extruded aluminum slide. The sliding portion 54 may be capped via an end cap 56. End cap 56 may be polymeric material. In a specific example, end cap 56 is an injected molded glass filled polymer end cap. The end cap 56 may be used to connect the retraction element 36 to the sliding portion 54. In use, the sliding portion 54 moves between the sets of magnets 38. Integration of magnets within the slide extractor system creates eddy currents through the slide base, ensuring a controlled and low-speed return movement when the handle is released.

Figure 12:
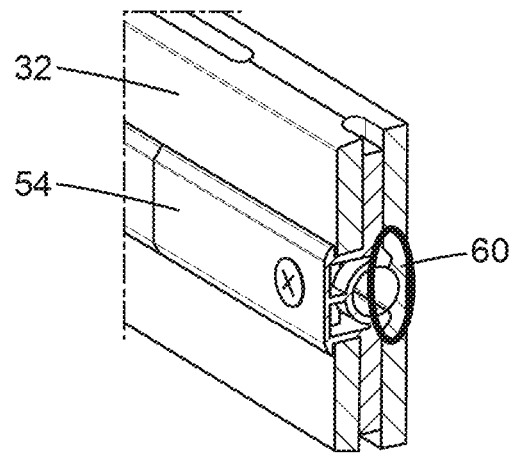
FIG. 12 shows an end side view of a sliding member positioned within a slide base, illustrating portions of potential wear.
Figure 13:
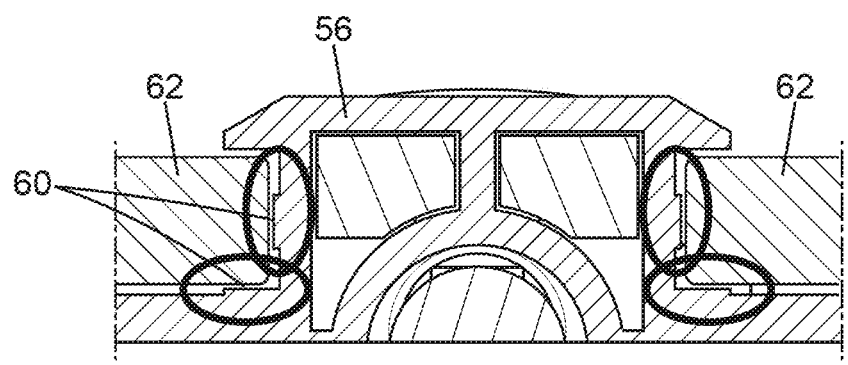
FIG. 13 shows a cut away view of potential portions for positioning of wear strips.

Because the whole slide base 32 rail/housing is a polymeric material (with embedded magnets) in this example, it is possible to provide selective wear strips 60 on portions expected to experience higher wear. For example, as illustrated by FIGS. 12 and 13, the sliding portion 54 abuts or otherwise cooperates with rail edges 62 at the circled portions. It is thus possible to provide one or more wear strips 60 along these cooperation surfaces. In a specific example, the wear strips 60 are thin aluminum strips that may be secured to the polymeric material of the rails.

Figure 14:
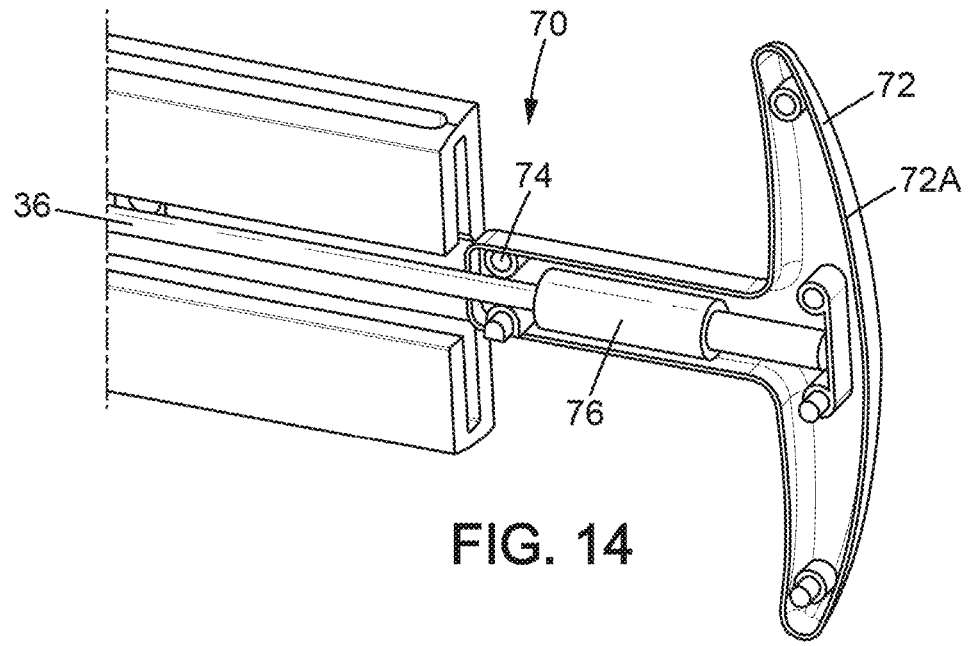
FIG. 14 shows a side view of a handle system with one handle part removed.
Figure 15:
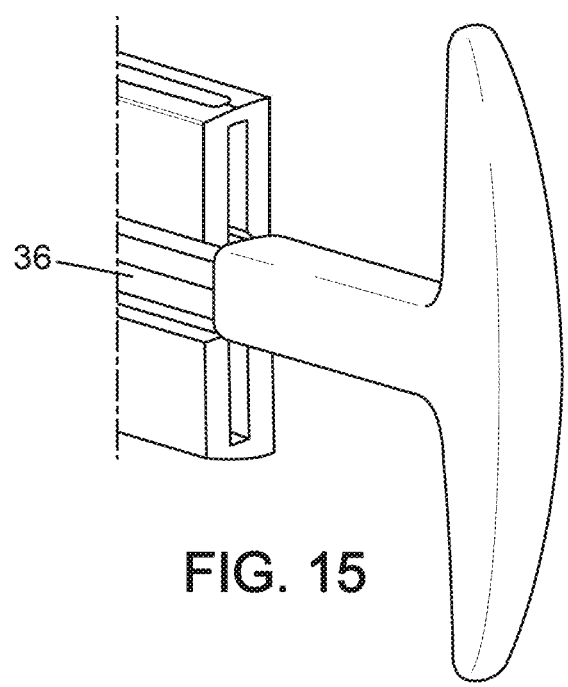
FIG. 15 shows the handle system of FIG. 14 in an assembled configuration.

FIGS. 14 and 15 illustrate an improved handle system 70 for a slide extractor system. Handle system 70 can help compensate for retraction member length. Current versions of slide extractors often exhibit a slack handle, that hangs down from the end of the slide base rail (out of the compartment 16), rather than being neatly retracted. This is generally due to the length of the retraction member cable that is required for use. Handle system 70 provides a two-part handle, with each part 72 of the two handle parts 72A, 72B being designed with the same shape and configured to snap or otherwise close with respect to one another. Each part 72 has one or more internal securement features 74 that are configured to receive and secure the retraction element 36.

Figure 16:
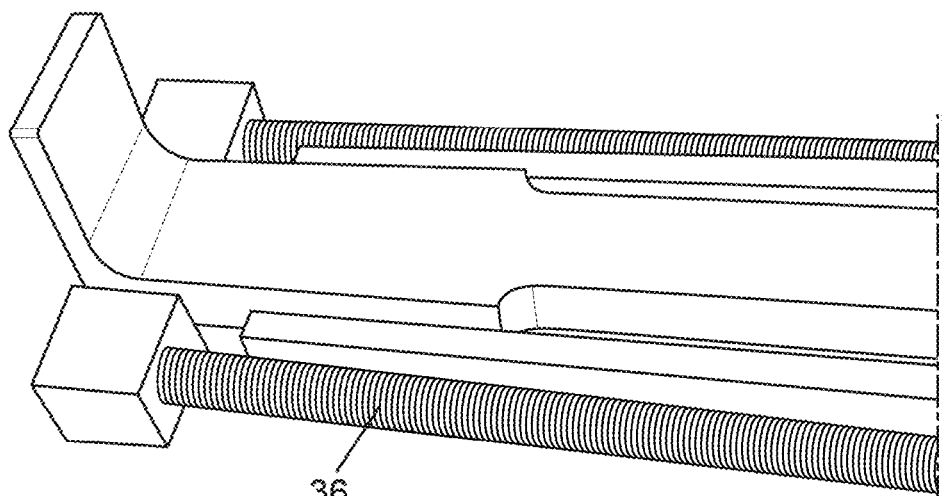
FIG. 16 shows a top perspective view of one embodiment of a spring retraction member.

The retraction element 36 may be a spring, a bungee-type cord, or any other element that creates stored potential energy. Use of a spring as the return mechanism/retraction element 36 has been found particularly beneficial as having a potentially increased lifespan. Bungee cords are more prone to aging. An exemplary spring as illustrated by FIG. 16. The retraction element 36 may also have a abutment member 76 position with respect thereto. The abutment member 76 can be positioned around the retraction member 36 and can help secure the handle parts 72 to the retraction member 36.

Figure 17A:
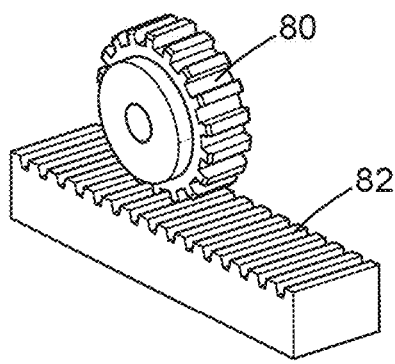
FIG. 17A shows a side perspective view of a pinion wheel and rack according to an alternate embodiment of this disclosure.
Figure 17B:
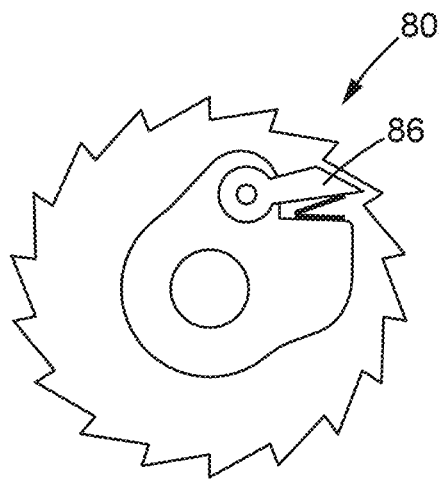
FIG. 17B shows a side plan view of a pinion wheel.
Figure 17C:
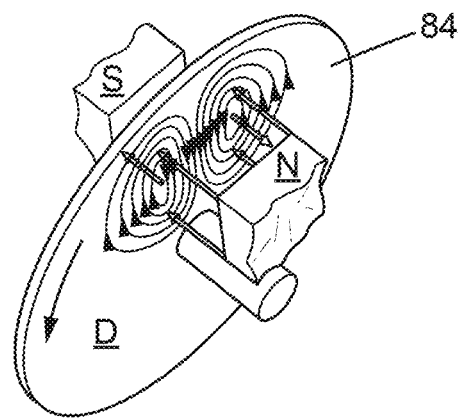
FIG. 17C shows an illustration of magnetic force applied to a pinion wheel.
Figure 17D:
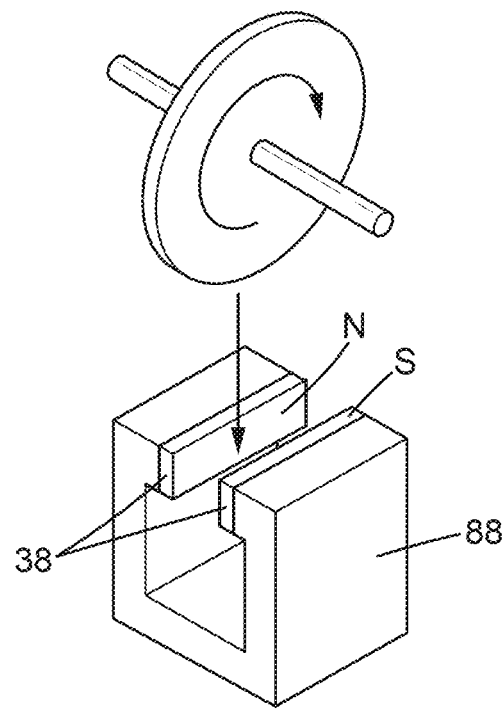
FIG. 17D shows an exploded view of a disc and magnet embodiment.
Figure 17E:
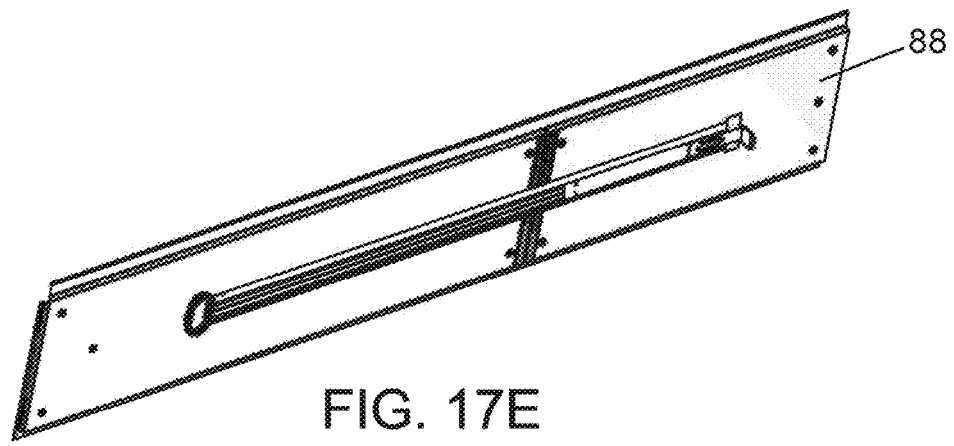
FIG. 17E shows a side perspective view of one embodiment of a track that may be used in connection with the pinion wheel/disc and magnet option.

An alternate embodiment is illustrated by FIGS. 17A-17E. In this example, it is possible for the eddy current to be provided by a pinion wheel 80 that runs over a toothed rack 82, allowing for a "governor" principal as the braking system. The pinion wheel may have a tooth stop 86, as illustrated by FIG. 17B. FIG. 17C illustrates that the pinion wheel 80 may be connected to an eddy current disc/magnet 84, which causes braking to happen. Within the pinion wheel 80, it is possible to provide a free wheel mechanism to ensure that braking only occurs during retraction, and not while the movable member is being extracted/pulled out. The tooth stop 86 may assist with this free wheel movement. In one example, the wheel may be provided as an aluminum disc and a magnetic field is created within the track 88 via one or more magnets 38. In a specific example, the slide base 88 may be aluminum, copper, or any combination thereof. One or more magnets 38 may be positioned within the slide base such that they cause braking at certain speeds.

Figure 18A:
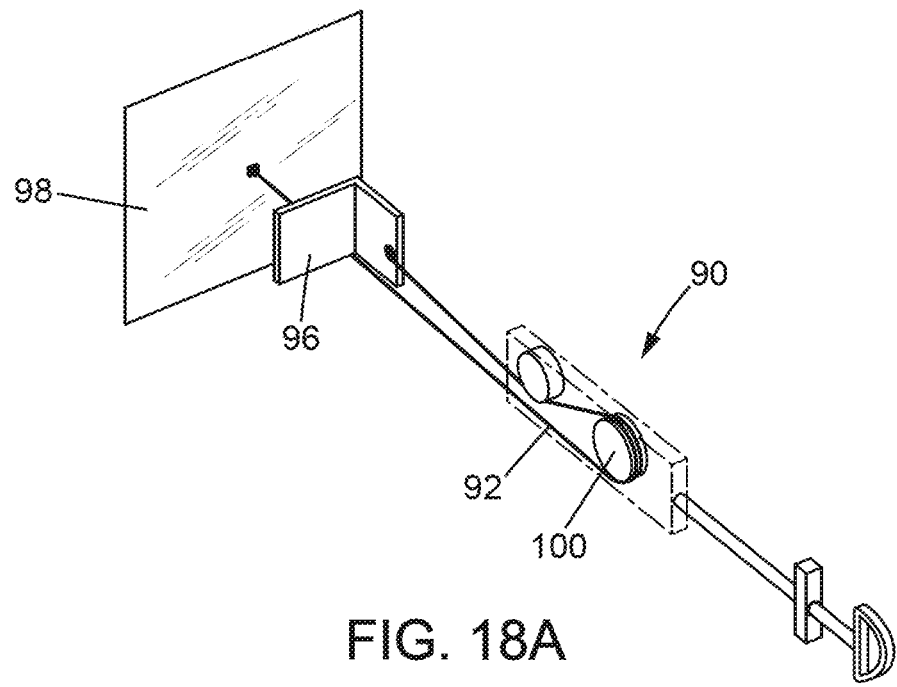
FIG. 18A shows a side plan view of a pulley embodiment.
Figure 18B:
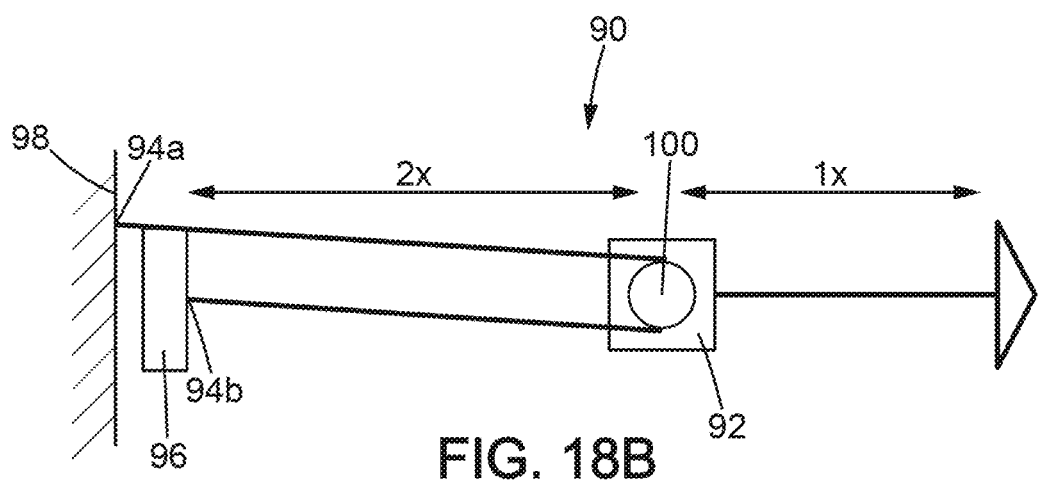
FIG. 18B shows a side schematic view of the pulley embodiment of FIG. 18A in a slide extractor closed position.
Figure 18C:
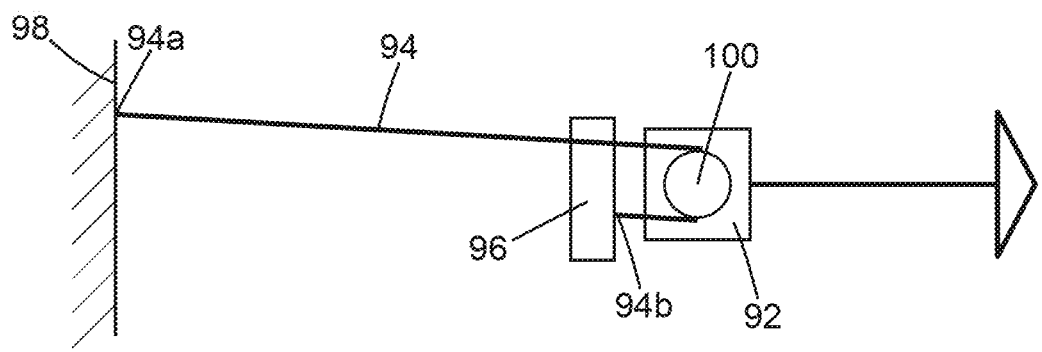
FIG. 18C shows schematic view of the pulley embodiment of FIG. 18A in a slide extractor extended position.

FIGS. 18A-18C illustrate a pulley system 90 option. In this option, movable member 92 may have a portion 100 (such as a rotating wheel) around which a pulley 94 maneuvers. One side of the pulley 94*a* is secured to a rear wall 98 of the compartment. Another side of the pulley 94*b* is secured to a pulley plate 96. The pulley system 90 can act similarly to the pinion embodiment described above. This can allow the extracted cable length to be reduced. As illustrated by FIGS. 18B and 18C, use of pulley system 90 results in the extracted cable and the handle needing to travel only half the length that would otherwise be required. This embodiment may be particularly interesting for use in connection with extremely deep compartments (e.g., triple or more containers) and/or for trolleys. As described herein, integrated magnets may be used (either in the track or in the moveable member) for braking action. The pulley plate 96 can also deliver braking action.

In summary, integration of eddy currents principle into slide extractors may be accomplished at any component level. It should also be understood that the principles described herein may be used in other extraction situations, including but not limited to hinges, door hinges drawers, drawer slides, hatches, doors, and/or door open hold devices in order to reduce the speed of any spring loaded (or forced) movable parts to a controlled and hazardous free movement. By introducing eddy currents as braking method in these uses, there is also provided a braking function without mechanical interaction, preventing wear of any of the eddy current-integrated parts, such as brake pads and discs. It is envisioned that the current principles described herein may be integrated into any of the above alternate uses in order to limit fast movement and obtain more controlled operation of these parts, without introducing "noticeable" braking/clamping forces.

The disclosed eddy current braking is generally linear to the applied force/speed. With "normal" low movement, there is almost no eddy current interaction, meaning that the braking system will never brake up to a complete stop. Integrating the eddy current principals into the slide extractors, sliders, or other uses described herein enables braking during movement.

It should be understood that various different features described herein may be used interchangeably with various embodiments. For example, if one feature is described with respect to particular example, it is understood that that same feature may be used with other examples as well. Changes and modifications, additions and deletions may be made to the structures and methods recited above and shown in the drawings without departing from the scope or spirit of the disclosure or the following claims.

What is claimed is:

1. A system for slowing movement of a slide extractor used in an aircraft galley for moving one or more containers and/or trolleys forward within a storage area, the system comprising:

a slide base comprising a channel;
    a movable member positioned within the channel and slidable with respect to the slide base;
    a retraction element associated with the movable member; and
    one or more magnets associated with either the slide base or the movable member;
    and wherein the other of the slide base or the movable member comprises at least a portion of a conductive surface,
    wherein proximity of the one or more magnets to the portion of a conductive surface causes slowing of the movable member with respect to the slide base.

2. The system of claim 1, wherein the one or more magnets is positioned within an internal channel of the slide base.

3. The system of claim 2, wherein at least a first portion of the one or more magnets are positioned in a first rail portion of the slide base and wherein at least a second portion of the one or more magnets are positioned in a second rail portion.

4. The system of claim 1, wherein at least a portion of the slide base is manufactured of a polymeric material.

5. The system of claim 4, further comprising one or more wear strips positioned at slide base rail edges where the moveable member slides with respect thereto.

6. The system of claim 1, wherein the at least a portion of a conductive surface is positioned on a sliding portion of the movable member.

7. The system of claim 6, wherein the movable member further comprises a polymeric flange.

8. The system of claim 6, wherein the movable member further comprises a polymeric end cap.

9. The system of claim 1, further comprising a handle secured to at least one end of the retraction element.

10. The system of claim 9, wherein the handle comprises two symmetrical parts configured to cooperate with one another.

11. The system of claim 9, wherein the retraction element is secured within the handle via an abutment member.

12. The system of claim 1, wherein the moveable member comprises a pinion wheel and wherein the slide base comprises a toothed rack.

13. The system of claim 1, further comprising a pulley system configured to coordinate movement of the moveable member within the slide base.

14. The system of claim 13, wherein the pulley system comprises a wheel secured to the movable member and a pulley plate to which a portion of the pulley is secured.

* * * * *